(No Model.)
J. N. PEW.
GAS MAIN.
No. 373,093. Patented Nov. 15, 1887.
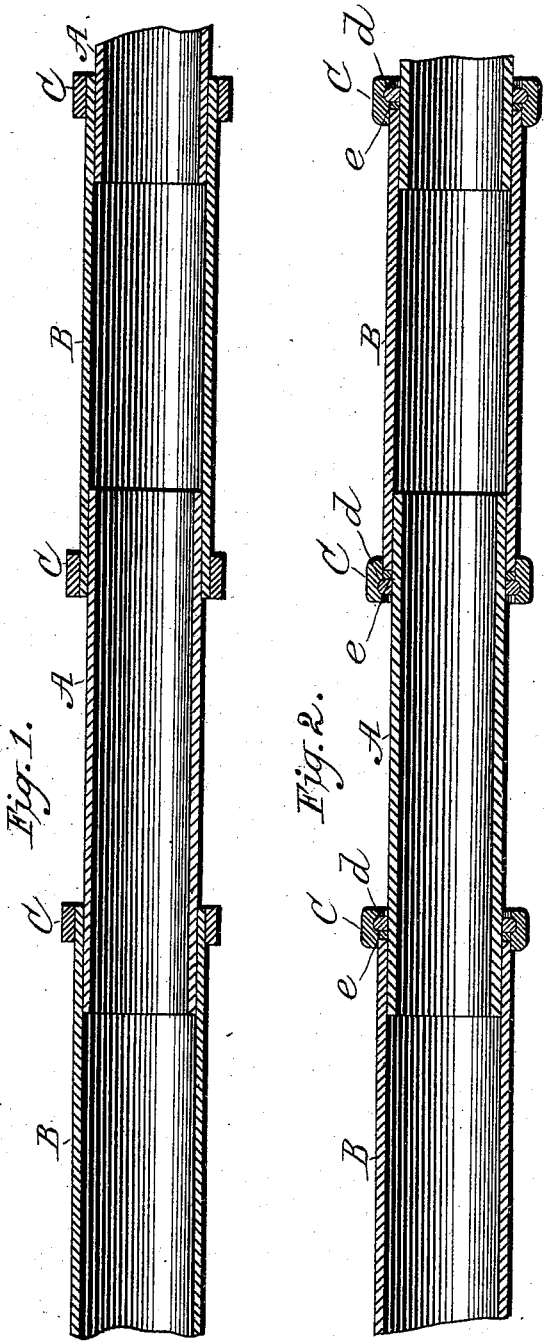

UNITED STATES PATENT OFFICE.

JOSEPH N. PEW, OF PITTSBURG, PENNSYLVANIA.

GAS-MAIN.

SPECIFICATION forming part of Letters Patent No. 373,093, dated November 15, 1887.

Application filed June 19, 1886. Serial No. 205,680. (No model.)

*To all whom it may concern:*

Be it known that I, JOSEPH N. PEW, residing at Pittsburg, in the county of Allegheny and State of Pennsylvania, a citizen of the United States, have invented or discovered a certain new and useful Improvement in Gas-Mains, of which improvement the following is a specification.

In the accompanying drawings, which make part of this specification, Figures 1 and 2 represent sections of natural-gas mains laid in accordance with my invention.

The object of my improvement, primarily, is to reduce the friction caused by the flow of natural gas through mains whose interior surfaces are made rough by the present system of joints, and incidentally to make a stronger main. As pipes are now laid the sections are of equal diameter and secured to each other by sleeves, collars, or rings, with suitable packing. Under this system the ends of the pipes do not touch, and the intervening space is covered by the sleeve, which thus becomes an integral portion of the main and as fully exposed to the pressure of the gas as any other part of the pipe line. There is also a recess formed at every joint, the depth of which is measured by the thickness of the pipe and the length by the space between the ends of the pipe-sections. This irregularity, constantly recurring, very seriously diminishes the flow of gas in a long line.

My improvement contemplates the use of pipe of two different diameters, of such relative size that every alternate pipe shall slip into the adjoining section.

By this device the projections impeding the flow of gas will be diminished by one-half in number, as they will only occur at every other joint.

Throughout the drawings, A and B indicate pipe-lengths. In Fig. 1, A is turned off and is made to fit smoothly within B. The ring C, which is made with a slight taper, is heated and shrunk upon B, while the pipes A and B are kept cool by a jet of water playing from the inside. When the pipes are very thin, A may be kept in its proper place by means of a mandrel inserted for that purpose while C is being driven on.

Fig. 2 shows a main with a modified joint, the ring C being extended to leave space for the packing, consisting of a lead ring, $e$, and rubber ring $d$, or a series of lead and rubber rings, as described by me in my application for an expansion-joint, No. 198,060, dated April 7, 1886.

When my method is used in laying a wrought-iron main, the entire line subject to direct pressure will be of wrought-iron, instead of alternate wrought-iron pipes and cast-iron sleeves, as at present.

This improvement can be applied to great advantage on lines of large pipe, where it is very difficult to get a satisfactory screw-thread joint, and is desirable whether the pipe is cast-iron or steel.

I am aware that heretofore pipe-lengths of different diameters have been connected; but I do not know of the alternation of such pipe-lengths designed to accomplish a new and useful purpose prior to my invention.

I claim, therefore—

A main composed, essentially, of alternating pipe-lengths of larger and smaller diameter, the ends of the latter fitting within the former, with means for retaining the same in position, substantially as and for the purposes described.

In testimony whereof I have hereunto set my hand.

JOSEPH N. PEW.

Attest:
WILLIAM L. PIERCE,
H. T. MORRIS.